United States Patent
Verma et al.

(10) Patent No.: US 6,633,844 B1
(45) Date of Patent: Oct. 14, 2003

(54) LATE INTEGRATION IN AUDIO-VISUAL CONTINUOUS SPEECH RECOGNITION

(75) Inventors: Ashish Verma, New Delhi (IN); Sankar Basu, Tenafly, NJ (US); Chalapathy Neti, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/452,919

(22) Filed: Dec. 2, 1999

(51) Int. Cl.[7] .............................................. G10L 15/04
(52) U.S. Cl. ...................... 704/251; 704/249; 704/244; 704/275; 704/266; 382/115; 382/118; 382/170; 382/209; 434/185; 434/169; 434/167; 434/310; 345/433; 345/435; 345/441; 345/442
(58) Field of Search ............................... 704/270–275, 704/251, 231, 256, 244, 249, 246, 254, 240, 242, 243, 277, 239, 266; 382/115, 118, 209, 170; 345/433, 435, 441, 442; 434/185, 169, 167–168, 308–312

(56) References Cited

U.S. PATENT DOCUMENTS

| | | | | |
|---|---|---|---|---|
| 4,449,189 A | * | 5/1984 | Feix et al. | 704/272 |
| 4,884,972 A | * | 12/1989 | Gasper | 434/185 |
| 4,972,486 A | * | 11/1990 | Cornett et al. | 704/271 |
| 5,412,738 A | * | 5/1995 | Brunelli et al. | 382/115 |
| 5,625,704 A | * | 4/1997 | Prasad | 382/118 |
| 5,907,351 A | * | 5/1999 | Chen et al. | 348/14.12 |
| 5,938,447 A | * | 8/1999 | Kirksey | 434/169 |
| 6,219,640 B1 | * | 4/2001 | Basu et al. | 704/246 |
| 6,250,928 B1 | * | 6/2001 | Poggio et al. | 434/185 |
| 6,330,023 B1 | * | 12/2001 | Chen | 348/14.13 |

FOREIGN PATENT DOCUMENTS

EP  0 336 032 A1 * 10/1989 ............. G10L/5/06

OTHER PUBLICATIONS

Tsuhan Chen et al., "Audio–Visual Integration in Multimodal Communication", Proceedings of IEEE, vol. 86, May 1998.

E.D. Petajan, "Automatic lipreading to enhance speech recognition", Proc. IEEE Global Telecommunication Conf., Atlanta, Georgia, USA, 1984.

C. Bregler et al., "A Hybrid Approach to Bimodal Speech Recognition", Conference on Signals, Systems and Computers, Pacific Gove, CA, 1994.

G. Potamianos et al., "Discriminative Training of HMM Stream Exponents for Audio–Visual Speech Recognition", ICASSP'98, 1998.

C. Bregler et al., ""Eigin–lips" for Roabust Speech Recognition", ICASSP'94, 1994.

C. Bregler et al., "Bimodal Sensor Integration on the Example of "Speech Reading"", IEEE International Conference on Neural Networks, 1993.

Uwe Meier et al., "Adaptive Bimodal Sensor Fusion for Automatic Speechreading", ICASSP'96, 1996.

(List continued on next page.)

*Primary Examiner*—Vijay Chawan
(74) *Attorney, Agent, or Firm*—Ference & Associates

(57) ABSTRACT

The combination of audio and video speech recognition in a manner to improve the robustness of speech recognition systems in noisy environments. Contemplated are methods and apparatus in which a video signal associated with a video source and an audio signal associated with the video signal are processed, the most likely viseme associated with the audio signal and video signal is determined and, thereafter, the most likely phoneme associated with the audio signal and video signal is determined.

27 Claims, 1 Drawing Sheet

OTHER PUBLICATIONS

A. Senior, "Face and feature finding for face recognition system", 2nd Int. Conf. on Audio–Video based Biometric Person Authentication, Washington, DC, Mar. 1999.

S. Basu et al., "Audio–Visual Large Vocabulary Continuous Speech Recognition in the Broadcast Domain", IEEE Workshop on Multi–Media Signal Processing, Sep. 13–15, Copenhagen. 1999.

M. Alissali et al., "A synchronous Integration of Visual Information in An Automatic Speech Recognition System", ICSLP'96, 1996.

Iain Matthews, "Features for audio visual speech recognition", Ph.D. dissertation, School of Information Systems, University of East Angalia, Jan. 1998.

* cited by examiner

LATE INTEGRATION IN AUDIO-VISUAL CONTINUOUS SPEECH RECOGNITION

FIELD OF THE INVENTION

The present invention relates generally to the use of visual information in speech recognition.

BACKGROUND OF THE INVENTION

In speech recognition, the use of visual information has been of interest since speech recognition efficiency can be significantly improved in conditions where audio-only recognition suffers due to a noisy environment. Particularly, a main focus of recent developments has been to increase the robustness of speech recognition systems against different types of noises in the audio channel.

In this connection, it has been found that the performance of most, if not all, conventional speech recognition systems has suffered a great deal in a non-controlled environment, which may involve, for example, background noise, a bad acoustic channel characteristic, crosstalk and the like. Thus, video can play an important role in such contexts as it provides significant information about the speech that can compensate for noise in the audio channel. Furthermore, it has been observed that some amount of orthogonality is present between the audio and the video channel, and this orthogonality can be used to improve recognition efficiency by combining the two channels. The following publications are instructive in this regard: Tsuhan Chen and Ram R. Rao, "Audio-Visual Integration in Multimodal Communication", Proceedings of IEEE, vol. 86, May 1998; H. McGurk and J. MacDonald, "Hearing Lips and seeing voices", Nature, pp. 746–748, December 1976; and K. Green, "The use of auditory and visual information in phonetic perception", Speechreading by Humans and Machines, D. Stork and M. Hennecke, Eds Berlin, Germany.

Experiments have also been conducted with various features of audio and visual speech and different methods of combining the two information channels. One of the earliest audio-visual speech recognition systems was implemented by E. D. Petajan (see E. D. Petajan, "Automatic lipreading to enhance speech recognition", Proc. IEEE Global Telecommunication Conf., Atlanta, 1984; and E. D. Petajan, B. Bischoff, D. Bodoff and N. M. Brooke, "An improved automatic lipreading system to enhance speech recognition", Proc. CHI'88 pp. 19–25). In Petajan's experiment, binary images were used to extract mouth parameters such as height, width and area of the mouth of the speaker. These parameters were later used in the recognition system. The recognition system was an audio speech recognizer followed by a visual speech recognizer. Therefore, a visual speech recognizer would work only on a subset of all of the possible candidates which were supplied to it by the audio speech recognizer. Later, the system was modified to use the images themselves instead of the mouth parameters and the audiovisual integration strategy was changed to a rule-based approach from the sequential integration approach.

A. J. Goldschen, in "Continuous automatic speech recognition by lipreading" (Ph.D. dissertation, George Washington University, Washington, September 1993), analyzed a number of features of the binary images such as height, width and perimeter, along with derivatives of these quantities, and used these features as the input to an HMM (Hidden Markov Model)-based visual speech recognition system. Since then, several experiments have been performed by various researchers to improve upon these basic blocks of audio-visual speech recognition (Chen et al., supra, and: Gerasimos Potamianos and Hans Peter Graf, "Discriminative Training of HMM Stream Exponents for Audio-Visual Speech Recognition", ICASSP '98; Christopher Bregler and Yochai Konig, "'Eigenlips' for Robust Speech Recognition", ICASSP '98; C. Bregler, Stefan Manke, Hermann Hild, Alex Waibel, "Bimodal Sensor Integration on the Example of 'Speech Reading'", IEEE International Conference on Neural Networks, 1993; Uwe Meier, Wolfgang Hürst and Paul Duchnowski, "Adaptive Bimodal Sensor Fusion for Automatic Speechreading", ICASSP '96; C. Bregler, H. Manke, A. Waibel, "Improved Connected Letter Recognition by Lipreading", ICASSP '93; and Mamoun Alissali, Paul Deleglise and Alexandrina Rogozan, "Asynchronous Integration of Visual Information in an Automatic Speech Recognition System", ICSLP '96).

However, challenges are often encountered when there is a need to combine audio and visual streams in an intelligent manner. While a general discussion of data fusion may be found in "Mathematical Techniques in Multisensor Data Fusion" (David L. Hall, Artech House, 1992), the article "Audio-Visual Large Vocabulary Continuous Speech Recognition in the Broadcast Domain" (Basu et al., IEEE Workshop on Multimedia Signal Processing, Sep. 13–15, Copenhagen 1999) describes early attempts at audio-visual recognition. A need, however, has been recognized in connection with producing improved results.

Generally speaking, some problems have been recognized in conventional arrangements in combining audio with video for speech recognition. For one, audio and video features have different dynamic ranges. Additionally, audio and video features have different numbers of distinguishable classes, that is, there are typically a different number of phonemes than visemes. Further, due to complexities involved in articulatory phenomena, there tends to be a time offset between audio and video signals (see "Eigenlips", supra). Moreover, video signals tend to be sampled at a slower rate than the audio and, therefore, needs to be interpolated.

In view of the problems stated above and others, two different approaches to combine audio and visual information have been tried. In the first approach, termed "early integration" or "feature fusion", audio and visual features are computed from the acoustic and visual speech, respectively, and are combined prior to the recognition experiment. Since the two sets of features correspond to different feature spaces, they may differ in their characteristics as described above. Therefore, this approach essentially requires an intelligent way to combine the audio and visual features. The recognition is performed with the combined features and the output of the recognizer is the final result. This approach has been described in Chen et al., Potamianos et al., "Eigenlips" and Basu et al, supra. However, it has been found that this approach cannot handle different classifications in audio and video since it uses a common recognizer for both.

In the second approach, termed "late integration" or "decision fusion", separate recognizers are incorporated for audio and visual channels. The outputs of the two recognizers are then combined to arrive at the final result. The final step of combining the two outputs is essentially the most important step in this approach since it concerns issues of orthogonality between the two channels as well as the reliability of the two channels. This approach tends to handle very easily the different classifications in audio and video channels as the recognizers for them are separate and the combination is at the output level. This approach has been described in "Bimodal Sensor Integration", Meier et al., "Improved Connected Letter . . . " and Alissali et al., supra.

However, it is to be noted that conventional approaches, whether involving "early" or "late" integration, use a single-phase experiment with a fixed set of phonetic or visemic classes and that the results are not always as favorable as desired. A need has thus been recognized in connection with providing a more effective combination strategy.

SUMMARY OF THE INVENTION

The present invention broadly contemplates method and apparatus for providing innovative strategies for data fusion, particularly, multi-phase (such as two-phase) hierarchical combination strategies. Surprising and unexpected results have been observed in connection with the inventive strategies.

In accordance with at least one presently preferred embodiment of the present invention, in particular, the combined likelihood of a phone is determined in two phases. In the first phase, a limited number of viseme-based classes (which will typically be smaller than the number of corresponding phoneme-based classes) are used for both audio and video. At the end of the first phase, the most likely viseme-based class is determined. However, in the second phase, only those phones that are embedded in the viseme given by the first phase are considered.

The present invention, in accordance with at least one presently preferred embodiment, broadly contemplates methods and apparatus in which a video signal associated with a video source and an audio signal associated with the video signal are processed, the most likely viseme associated with the audio signal and video signal is determined and, thereafter, the most likely phoneme associated with the audio signal and video signal is determined.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

The present invention will be explained below in the context of an illustrative speech recognition implementation. However, it is to be understood that the present invention is not limited to a particular application or structural embodiment. Rather, the invention is more generally applicable to essentially any situation in which it is desirable to improve speech recognition accuracy and provide automatic speech detection by employing visual information in conjunction with corresponding audio information during the recognition process.

The ensuing description may, if necessary, be supplemented by the disclosures of copending and commonly assigned U.S. patent application Ser. Nos. 09/369,706 and 09/369,707, hereby incorporated by reference herein, for a better understanding of some background concepts relating to speech recognition via combined audio and visual detection arrangements.

In a presently preferred embodiment of the present invention, speech recognition is achieved via audio processing and video processing. Both audio and video processing are used simultaneously to discern single phones produced by the subject (i.e., individual) being monitored. In turn, the phones are then linked together in order to discern words, sentences, etc.

Figure 1:
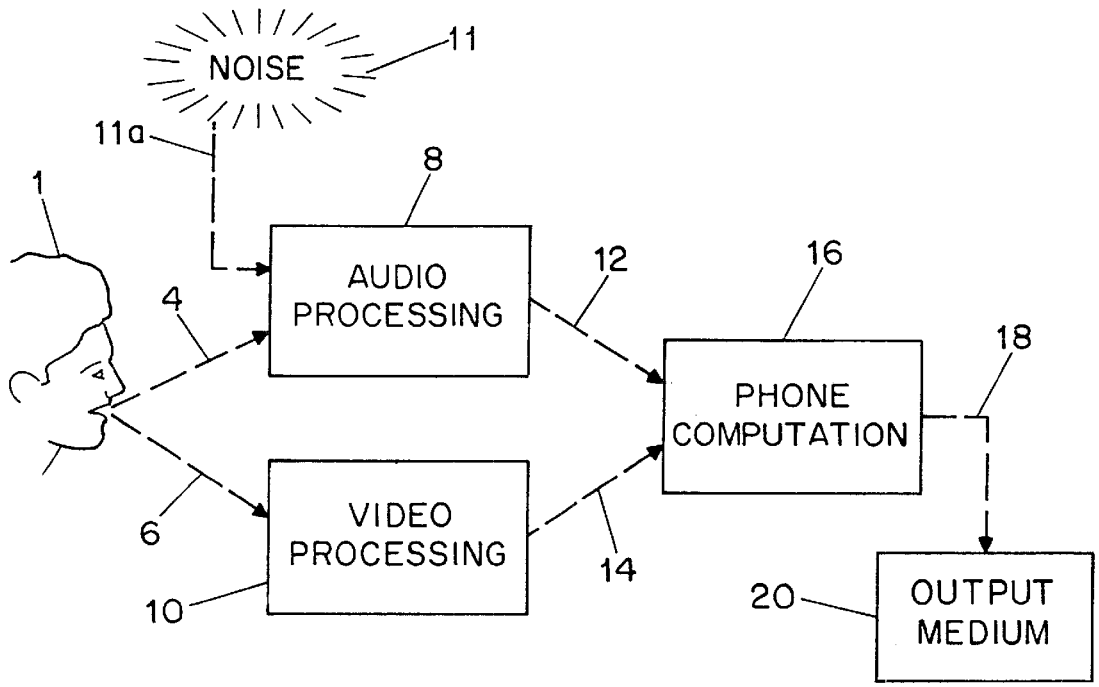
FIG. 1 is a schematic representation of an arrangement for processing audio and video signals to determine a phone uttered by a subject.

Thus, as shown in FIG. 1, in a rudimentary overview of the operating environment in accordance with at least one presently preferred embodiment of the present invention, a subject 1 may be positioned so as to provide discernible audio and video output (4 and 6, respectively) via his/her utterances to audio processing arrangement 8 and video processing arrangement 10, respectively. It will also be appreciated that environmental noise (indicated schematically at 11) will likely be picked up by audio processing arrangement 8 as another audio "input" 11a.

Generally, computation of the uttered phone will take place in an arrangement 16 that receives processed input 12 and 14, respectively, from the audio and video processing arrangements 8 and 10. Thence, the computed phone is provided as output 18 to a suitable output medium 20 selected for the purpose such as, for example, a further processing arrangement that might assemble the computed phones into words, sentences, etc., and display them on a viewing screen or even to an automatic translation system (e.g., a voice-to-text system or even voice-to-voice).

In accordance with a presently preferred embodiment of the present invention, audio processing is undertaken by extracting 24-dimensional mel-cepstral coefficient feature vectors from the audio input signal 4 by using conventional techniques in the speech recognition field. LDA (Linear Discriminant Analysis), for example, can be used to capture the dynamics of the audio signal 4. A more detailed description of audio processing, which may be employed in conjunction with the present invention, is found in Basu et al., supra. It will be understood, however, that essentially any suitable audio detection arrangement may be employed.

Likewise, essentially any suitable video detection arrangement may be employed. In accordance with a presently preferred embodiment of the present invention, a pyramid-based face detection approach may be used to extract the face of the subject 1 from a video capture, such as the approach described in Senior, supra.

In the approach described in Senior, supra, an image pyramid over the permissible scales is used to search the image space (e.g., video capture) for possible face candidates. Particularly, the image is subsampled by way of different factors, resulting in images of smaller size. Thus, images over different scales result from the single image originally presented. Every face candidate is given a score based on several features, such as skin tone and similarity to a training set of face images using Fisher Discriminant Analysis. Once the face has been found, a collection of facial features detectors can be used to determine and verify the locations of the important facial features, including the corners and centers of the lips. Subsequently, a mouth image (e.g., of a size 45×30, that is, 45 pixels in the "x" direction and 30 pixels in the "y" direction) is extracted from the face image centered around the lips. Principal Component Analysis (PCA), as described in Senior, supra, may be used to obtain the first 100 modes of variations of the lip image. Further, Linear Discriminant Analysis (LDA) may be used to obtain, e.g., a 35-dimensional visual feature vector from the PCA modes.

Figure 2:
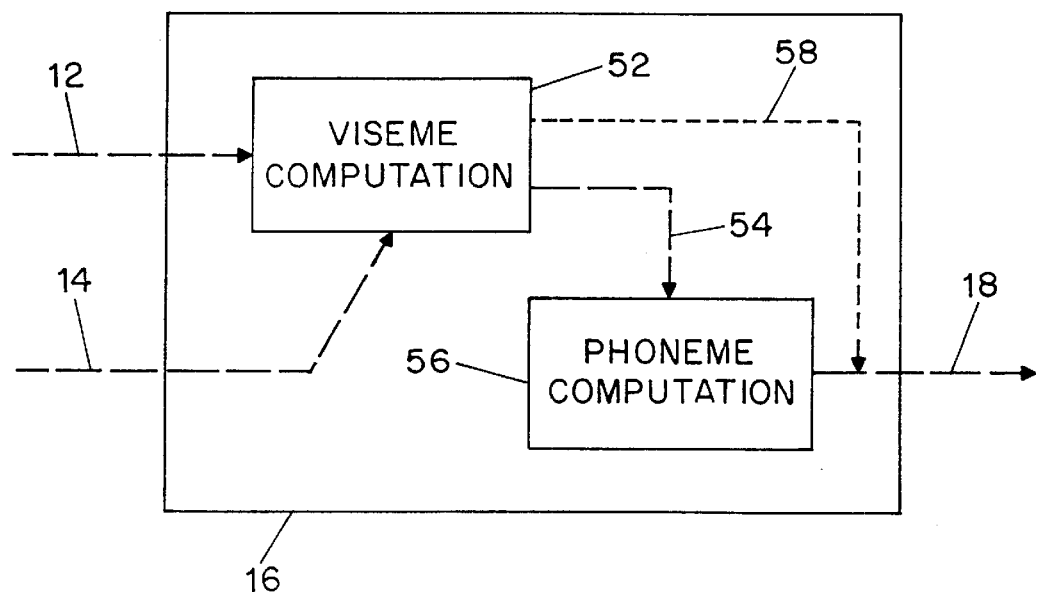
FIG. 2 is a schematic representation of a phoneme processing arrangement for determining a phone uttered by a subject.

FIG. 2 schematically illustrates the general makeup of a phone computation arrangement 16 in accordance with a presently preferred embodiment of the present invention. First, the processed audio and video inputs 12, 14 are fed into an arrangement 52 for determining the most likely viseme class corresponding to the audio and video inputs 12, 14. Thence, information relating to the most likely viseme class as well as information relating to the original audio and video inputs 12, 14, are directed as a composite input 54 into an arrangement 56 for determining the most likely phoneme given the input information. Subsequently, the aforementioned phone output 18 is produced. Details relating to the two-phase approach illustrated in FIG. 2 are provided below, along with a comparison of this approach to other, conventional methods.

Accordingly, in accordance with at least one presently preferred embodiment of the present invention, the combined likelihood that a given phoneme has been uttered by the subject 1 is determined in two phases. In the first phase, only a given number of viseme-based classes are utilized for the audio and video inputs 12, 14 so as to produce the most likely viseme-based class (in the form of input or information stream 54). In this connection, it will be appreciated that the range and number of visemes in the English language (and likely many other languages) is considerably smaller than the range and number of corresponding phonemes. In turn, each viseme corresponds to a set of one or more phonemes that can be readily associated with the viseme in question. Thus, the first phase of the presently contemplated two-phase approach results not in the discernment of the most likely phoneme candidate (as in conventional, one-phase methods) but of the most likely viseme candidate, itself representing a class or set of at least one phoneme.

In this vein, the second phase of the presently contemplated approach involves phoneme-based models for determining the most likely phoneme from the set of at least one phoneme that has been "narrowed down" in the first phase. In other words, in the second phase, only those phones are considered that were embedded in the viseme candidate produced by the first phase. It will thus be appreciated that in those instances in which the "most likely" viseme corresponds to only one phoneme, the second phase may essentially be skipped as the "most likely" phoneme will have already been produced. This "bypass" scenario is indicated schematically at 58 in FIG. 2.

The corresponding equations for the "likelihood" computations involved in a presently preferred embodiment of the present invention are presented below.

Thus, in "Phase 1", $$P_i = w_a^1 * P_{a,i} + w_v^1 * P_{v,i}, i=1, 2 \ldots, 27.$$

Further, in "Phase 2", $$P_j = w_a^2 * P_{a,j} + w_v^2 * P_{v,j}, j \in \{\text{viseme } k\},$$

where viseme k is determined as the most likely viseme in the first phase.

Further, $P_{a,i}$, $P_{v,i}$ and $P_i$ represent, respectively, the audio, video and combined likelihoods for viseme i in Phase 1 whereas $P_{a,j}$, $P_{v,j}$ and $P_j$ represent, respectively, the audio, video and combined likelihoods for phoneme j in Phase 2. Fifty-two (52) conventionally recognized phones of the English language were assumed, as were twenty-seven (27) conventionally recognized visemes. The following viseme classes are assumed (one in each set of parentheses), along with the phonemes assumed in each (that is, phonemes within each viseme class are assumed to look alike visually): (AA, AH, AX), (AE), (A0), (AW), (AXR, ER), (AY), (CH), (EH), (EY), (HH), (IH, IX), (IY), (JH), (L), (OW), (R), (UH, UW), (W), (X, D$), (B, BD, M, P, PD), (S, Z), (F, V), (OY), (D, DD, DX, G, GD, K, KD, N, NG, T, TD, Y), (TS), (TH, DH) and (SH, ZH). "X" represents a "silent" phoneme, while D$ represents a word boundary. A detailed overview of what each of the listed phonemes corresponds to may be found in P. Ladefoged, "A course in Phonetics", 3rd edition, Harcourt Brace College Publishers, 1993.

Additionally, $w_a^L$ and $w_v^L$ are weights given to audio and video hypothesis, respectively, where $w_a^L + w_v^L = 1$; L=1, 2. It will be noted that different audio weights $w_a^1$ and $w_a^2$ are used in Phase 1 and Phase 2 (and, by extension, different video weights).

The audio and video weights may be specified in advance in accordance with the noise levels that are known to be present. Alternatively, they could be automatically trained based on some held out data, that is data for which the recognition results are known.

The disclosure now turns to a discussion of experiments conducted with the method described above as compared against two conventional approaches. It was found that the inventive method described above performed considerably better than either of the two conventional methods.

In a first conventional, single-phase method ("Method 1"), phone-based classification was used for both audio and video. No attempt is thus made in Method 1 to specifically discern visemes produced by the subject but, instead, a direct determination is made of the most possible phoneme given the available video information. Accordingly, in Method 1, $$P_i = w_a * P_{a,i} + w_v * P_{v,i}, i=1, 2 \ldots, 52,$$

where $P_a$, $P_v$ and $P_i$ represent, respectively, the audio, video and combined likelihoods for phoneme I, whereas, again, $w_a$ and $w_v$ are weights given to audio and video hypothesis, respectively (where $w_a + w_v = 1$). Again, 52 English-language phonemes are assumed.

In the second conventional, single-phase method ("Method 2"), phone-based classes were used for audio data while viseme-based classes were used for video data. The same 27 visemes and associated 52 phonemes are assumed as described earlier. In Method 2, $$P_i = w_a * P_{a,i} + w_v * M_{ij} * P_{v,j},$$

where $P_{v,j}$ is the likelihood for viseme j given by video vector and $M_{ij}$ is the conditional probability of phone i given viseme j. "$M_{ij}$"s have been computed from over 300 sentences from the same VVAV ("ViaVoice Audio-Visual") database. Here again, $w_a + w_v = 1$.

For the purposes of the present discussion, the inventive two-phase method described prior to the two conventional single-phase methods will be referred to as "Method 3".

Results corresponding to Methods 1, 2 and 3 are given in Tables 1, 2 and 3, respectively. It will be noted that the results are phonetic classification results. Usually, these correspond to much higher recognition rates for the speech recognition system. For a "noisy" audio signal, crosstalk (or "cocktail noise") was collected and used at various SNR (signal-to-noise ratio) levels.

TABLE 1

Results for Method 1

|  | Audio (phonetic) | Visual (phonetic) | Combined (phonetic) |
|---|---|---|---|
| clean | 47.67% | 21.12% | 51.15% |
| 20 db | 36.26% | 21.12% | 43.40% |
| 15 db | 27.90% | 21.12% | 32.23% |
| 10 db | 21.77% | 21.12% | 26.33% |

TABLE 2

Results for Method 2

|  | Audio (phonetic) | Visual (visemic) | Combined (phonetic) |
|---|---|---|---|
| clean | 47.67% | 29.19% | 49.51% |
| 20 db | 36.26% | 29.19% | 38.10% |
| 15 db | 27.90% | 29.19% | 30.36% |
| 10 db | 21.77% | 29.19% | 25.64% |

TABLE 3

Results for Method 3

|  | Audio | Visual | Combined |
|---|---|---|---|
| clean (visemic) | 61.25% | 29.21% | 63.23% |
| clean (phonetic) | 47.67% | 21.12% | 50.94% |
| 20 db (visemic) | 57.65% | 29.21% | 60.69% |
| 20 db (phonetic) | 36.26% | 21.12% | 45.18% |
| 15 db (visemic) | 42.53% | 29.21% | 53.26% |
| 15 db (phonetic) | 27.90% | 21.12% | 38.15% |
| 10 db (visemic) | 35.96% | 29.21% | 49.57% |
| 10 db (phonetic) | 21.77% | 21.12% | 34.34% |

As shown in Table 1, the simplest form of integration yields about 20.94% relative improvement (10 db SNR) in the phonetic classification experiments when video and audio are combined (Method 1). In Method 2, in which separate sets of classes for audio and video are used, the relative improvement is about 17.76%. It will be noted that the video-only classification rates shown in Table 2 (for Method 2) are for viseme-based classes.

Table 3 provides the results for Method 3 (performed in accordance with at least one presently preferred embodiment of the present invention). The rows designated as "visemic" represent results for the first phase, in which classification is undertaken on the basis of 27 viseme classes. The "phonetic" rows show the overall result for phonetic classification after the second phase. It can be seen that there is a significant improvement in the viseme classification in the first phase. Further, the overall improvement in the second phase outperforms the conventional methods (1 and 2) in that up to 57% relative improvement is exhibited for the phonetic classification in the 10 db SNR case. Relative improvement is determined as follows: if $e_o$ is the % original (baseline) error rate then $100*(e_o-e_i)/e_i$ is the relative improvement.

Although numerous advantages associated with the presently contemplated methods and arrangements will be apparent to those of ordinary skill in the art, it will be appreciated from the foregoing that, among other things, in a "second phase" of a two-phase method according to at least one presently preferred embodiment of the present invention, it is the case that, since only the most likely viseme candidate is explored, the computational overhead involved in that phase can be very small.

It is to be understood that the present invention, in accordance with at least one presently preferred embodiment, includes a video signal processor, an audio signal processor, a viseme determinator, and a phoneme determinator, which together may be implemented on a general-purpose computer running suitable software programs. These may also be implemented on an Integrated Circuit or part of an Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of providing speech recognition, the method comprising the steps of:

processing a video signal associated with a video source;

processing an audio signal associated with the video signal;

determining the most likely viseme associated with the audio signal and video signal;

thereafter determining a restricted set of at least one phoneme candidate, the at least one phoneme candidate being related to the most likely viseme; and thereafter determining, solely from the restricted set of at least one phoneme candidate, the most likely phoneme associated with the audio signal and video signal.

2. The method according to claim 1, wherein the most likely viseme is determined on the basis of the probability that a given viseme i is associated with the video signal and the probability that the given viseme i is associated with the audio signal.

3. The method according to claim 3, wherein a pair of separate weights are assigned to the video probability of viseme i and the audio probability of viseme i.

4. The method according to claim 3, wherein the sum of said weights is 1.

5. The method according to claim 4, wherein the most likely phoneme is determined on the basis of the probability that a given phoneme j is associated with the video signal and the probability that the given phoneme j is associated with the audio signal.

6. The method according to claim 5, wherein a second pair of separate weights are assigned to the video probability of phoneme j and the audio probability of phoneme j.

7. The method according to claim 6, wherein the sum of said second pair of weights is 1.

8. The method according to claim 7, wherein said second pair of weights are distinct from said pair of weights associated with viseme i.

9. The method according to claim 8, wherein the following equation is used to determine the most likely viseme:

$$P_i = w_a^1 * P_{a,i} + w_v^1 * P_{v,i}, i=1, 2 \ldots N;$$

wherein $P_{a,i}$, $P_{v,i}$ and $P_i$ represent, respectively, the audio, video and combined probabilities for viseme i and $w_a^1$ and $w_v^1$ represent, respectively, the pair of weights associated with viseme i; and wherein N represents a finite number of assumed phonemes.

10. The method according to claim 9, wherein the following equation is used to determine the most likely phoneme subsequent to the determination of the most likely viseme:

$$P_j = w_a^2 * P_{a,j} + w_v^2 * P_{v,j}, j \in \{\text{viseme } k\};$$

wherein viseme k is the most likely viseme previously determined; and wherein $P_{a,j}$, $P_{v,j}$ and $P_j$ represent, respectively, the audio, video and combined likelihoods for phoneme j and $w_a^2$ and $w_v^2$ represent, respectively, the second pair of weights.

11. The method according to claim 1, wherein the audio signal is representative of conversational speech.

12. The method according to claim 1, wherein the audio signal is processed via Linear Discriminant Analysis.

13. The method according to claim 1, wherein the video signal is processed via a pyramid-based face detection approach.

14. Apparatus for providing speech recognition, the apparatus comprising:

a video signal processor associated with a video source;

an audio signal processor associated with the video signal;

a viseme determinator which determines the most likely viseme associated with the audio signal and video signal; and a phoneme determinator which thereafter determines a restricted set of at least one phoneme candidate, the at least one phoneme candidate being related to the most likely viseme, and thereafter determines, solely from the restricted set of at least one phoneme candidate, the most likely phoneme associated with the audio signal and video signal.

15. The apparatus according to claim 14, wherein said viseme determinator determines the most likely viseme on the basis of the probability that a given viseme i is associated with the video signal and the probability that the given viseme i is associated with the audio signal.

16. The apparatus according to claim 15, wherein a pair of separate weights are assigned to the video probability of viseme i and the audio probability of viseme i.

17. The apparatus according to claim 16, wherein the sum of said weights is 1.

18. The apparatus according to claim 17, wherein said phoneme determinator determines the most likely phoneme on the basis of the probability that a given phoneme j is associated with the video signal and the probability that the given phoneme j is associated with the audio signal.

19. The apparatus according to claim 18, wherein a second pair of separate weights are assigned to the video probability of phoneme j and the audio probability of phoneme j.

20. The apparatus according to claim 19, wherein the sum of said second pair of weights is 1.

21. The apparatus according to claim 20, wherein the second pair of weights are distinct from said pair of weights associated with viseme i.

22. The apparatus according to claim 21, wherein the following equation is used to determine the most likely viseme:

$$P_i = w_a^1 * P_{a,i} + w_v^1 * P_{v,i}, i=1, 2 \ldots N;$$

wherein $P_{a,i}$, $P_{v,i}$ and $P_i$ represent, respectively, the audio, video and combined probabilities for viseme i and $w_a^1$ and $w_v^1$ represent, respectively, the pair of weights associated with viseme i; and wherein N represents a finite number of assumed phonemes.

23. The apparatus according to claim 22, wherein the following equation is used to determine the most likely phoneme subsequent to the determination of the most likely viseme:

$$P_j = w_a^2 * P_{a,j} + w_v^2 * P_{v,j}, j \in \{\text{viseme } k\};$$

wherein viseme k is the most likely viseme previously determined; and wherein $P_{a,j}$, $P_{v,j}$ and $P_j$ represent, respectively, the audio, video and combined likelihoods for phoneme j and $w_a^2$ and $w_v^2$ represent, respectively, the second pair of weights.

24. The apparatus according to claim 14, wherein the audio signal is representative of conversational speech.

25. The apparatus according to claim 14, wherein the audio signal is processed via Linear Discriminant Analysis.

26. The apparatus according to claim 14, wherein the video signal is processed via a pyramid-based face detection approach.

27. A program storage device readable by machine, tangibly embodying a program of instructions executable by the machine to perform method steps for providing speech recognition, said method steps comprising:

processing a video signal associated with a video source;

processing an audio signal associated with the video signal;

determining the most likely viseme associated with the audio signal and video signal;

thereafter determining a restricted set of at least one phoneme candidate, the at least one phoneme candidate being related to the most likely viseme; and thereafter determining, solely from the restricted set of at least one phoneme candidate, the most likely phoneme associated with the audio signal and video signal.

* * * * *